United States Patent
Conus et al.

(10) Patent No.: US 10,255,642 B2
(45) Date of Patent: Apr. 9, 2019

(54) DISPLAY-CARD FOR TIME MANAGEMENT PURPOSE

(71) Applicant: Nagravision S.A., Cheseaux-sur-Lausanne (CH)

(72) Inventors: Christian Conus, Vuarmarens (CH); Pascal Conus, Vuarmarens (CH)

(73) Assignee: Nagravision S.A., Chesaux-sur-Lausanne (CH)

( * ) Notice: Subject to any disclaimer, the term of this patent is extended or adjusted under 35 U.S.C. 154(b) by 337 days.

(21) Appl. No.: 14/965,037

(22) Filed: Dec. 10, 2015

(65) Prior Publication Data

US 2016/0203565 A1    Jul. 14, 2016

(30) Foreign Application Priority Data

Jan. 9, 2015    (EP) .................................... 15150550

(51) Int. Cl.
*G06Q 40/00*    (2012.01)
*G07C 1/14*    (2006.01)
(Continued)

(52) U.S. Cl.
CPC ...    *G06Q 40/125* (2013.12); *G06Q 10/063114* (2013.01); *G06Q 10/1091* (2013.01); *G07C 1/14* (2013.01)

(58) Field of Classification Search
CPC .......... G06Q 10/105; G06Q 10/063114; G06F 3/147; G06F 3/1454
(Continued)

(56) References Cited

U.S. PATENT DOCUMENTS 5,064,999 A * 11/1991 Okamoto .................. G07F 7/08
                                                                235/379
6,924,781 B1    8/2005 Gelbman
(Continued)

FOREIGN PATENT DOCUMENTS

EP    2081139 A1    7/2009
JP    H09198537 A    7/1997

OTHER PUBLICATIONS

Intel Software: "Smart ID Badge at Research at Intel Days 2013" Jul. 23, 2013, Retrieved from the Internet: https://www.youtube.com/watch?v=aCUX2P3QYJw.
(Continued)

*Primary Examiner* — Vanel Frenel
(74) *Attorney, Agent, or Firm* — Oblon, McClelland, Maier & Neustadt, L.L.P.

(57) ABSTRACT

A display-card is disclosed for time management purpose, including a display; a clock defining a current date and time; a memory; an internal power supply; and a communication device. The memory includes a user identifier, setup information and time information. The time information includes at least a current time counter and a status information defining an active or an inactive state, the active state enabling the update with the clock of the current time counter and the inactive state disabling the update of the current time counter. The display-card further includes a receiver/transmitter to receive, via the communication device, a command to initiate the change of the status information from active to inactive state, or inactive to active state, and an actuator to initiate the display of at least the current time counter.

13 Claims, 1 Drawing Sheet

(51) Int. Cl.
*G06Q 10/06* (2012.01)
*G06Q 10/10* (2012.01)

(58) Field of Classification Search
USPC ............ 705/32, 7.28; 345/85, 2.3; 340/10.6, 340/8.1; 455/466; 235/379, 380; 902/8
See application file for complete search history.

(56) References Cited

U.S. PATENT DOCUMENTS

| | | | | |
|---|---|---|---|---|
| 7,908,192 | B2* | 3/2011 | Srinivasan | G06Q 10/06311 341/87 |
| 8,154,570 | B2* | 4/2012 | Blank | G07C 5/085 340/10.1 |
| 8,463,670 | B2* | 6/2013 | Chaar | G06F 9/485 700/14 |
| 2002/0175211 | A1* | 11/2002 | Dominquez | G06K 17/0022 235/492 |
| 2002/0184085 | A1* | 12/2002 | Lindia | G06Q 10/06398 705/7.42 |
| 2005/0273381 | A1* | 12/2005 | Thomas | G06Q 10/00 705/7.42 |
| 2006/0020503 | A1* | 1/2006 | Harris | G06Q 10/06398 705/7.42 |
| 2007/0050238 | A1* | 3/2007 | Carr | G06Q 10/10 |
| 2008/0296364 | A1 | 12/2008 | Pappas et al. | |
| 2008/0316007 | A1* | 12/2008 | Brinton | G06Q 10/06 340/425.5 |
| 2009/0312041 | A1 | 12/2009 | Tseng et al. | |
| 2011/0029420 | A1* | 2/2011 | Bianco | G06Q 10/06 705/32 |
| 2013/0024334 | A1 | 1/2013 | Kozlay | |
| 2015/0081486 | A1* | 3/2015 | Niazi | G06Q 10/1091 705/32 |

OTHER PUBLICATIONS

Vishal Bhalla, et al. "Bluetooth Based Attendance Mangement System", International Journal of Innovations in Engineering and Technology, Oct. 1, 2013, vol. 3, Issue 1, pp. 227-233.
International Search Report PCT/ISA/210 for European Application No. EP15150550 dated Jun. 26, 2015.

\* cited by examiner

DISPLAY-CARD FOR TIME MANAGEMENT PURPOSE

The present application hereby claims priority under 35 U.S.C. § 119 to European patent application number EP 15150550.0 filed Jan. 9, 2015, the entire contents of which are hereby incorporated herein by reference.

INTRODUCTION

The present invention refers to a portable solution for keeping track of the time management for any task for which a predefined time per unit is expected.

BACKGROUND ART

The management of time in companies is based on various systems such as a check in and out at the entrance of the building. The employee carries a card which could embed a wireless device able to communicate an identification of the employee. Other technologies based on a visual element such as a barcode are also suitable for quickly identifying an employee and record its presence within the company. When leaving the company, the same operation of identification is carried out and the absence of the employee is recorded.

These readers are connected to a centralized system that calculates, for each employee, the working time per day and the balance over a longer period such as a month. For employees having access to a computer during the working hours connected to the central management system, it is easy to check their current balance for the current day or the month.

For the other employees, the balance is conveniently displayed each time the employee carries out identification, i.e. at the arrival and the departure of the employee. During the day, the employee has no access to this information and has to guess the time spent in the company.

SUMMARY

According to one aspect of the invention, it is proposed a display-card for time management purpose, comprising a display, a clock defining a current date and time, a memory, an internal power supply and at least one communication device, said memory comprising a user identifier, setup information and time information, said time information comprising at least a current time counter and a status information, said status information defining an active or a inactive state, the active state enabling the update with the clock of the current time counter and the inactive state disabling the update of the current time counter, said display-card further comprising a receiver/transmitter to receive, via the communication device, a command to initiate the change of the status information from active to inactive state, or inactive to active state, and an actuator to initiate the display of at least the current time counter.

The display-card is meant to be carried by the employee and used to record the working time within the company. The display-card as proposed in the present application comprises a display to give additional information to the card's holder. In particular, with the cooperation of an internal clock, the display-card can calculate the duration of the current working time during the day. The main aim of a remote terminal is to record the beginning or the end of the active period of the employee. The remote terminal can be used for other actions such as checking the time balance for the day, the balance of the holidays or the time balance of the month.

The display-card as described below communicates with the wireless communication device with the remote terminal and receives the active or inactive status of the employee. This status is used to enable or disable the current time counter.

BRIEF DESCRIPTION OF THE FIGURES

The present invention will be better understood thanks to the attached figures, given in a non limitative way, in which.

DETAILED DESCRIPTION

Figure 1:
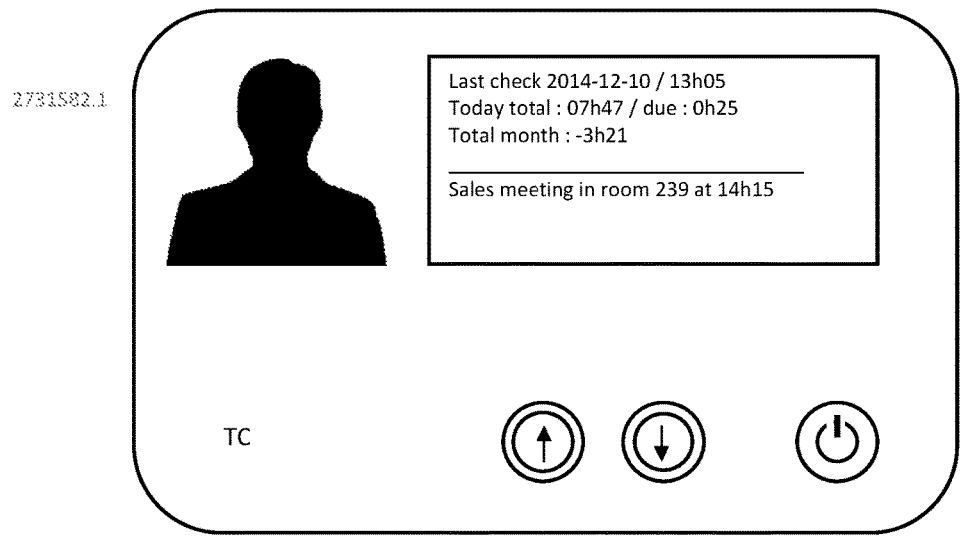
FIG. 1 illustrates the display-card according to one embodiment of the invention.
Figure 2:
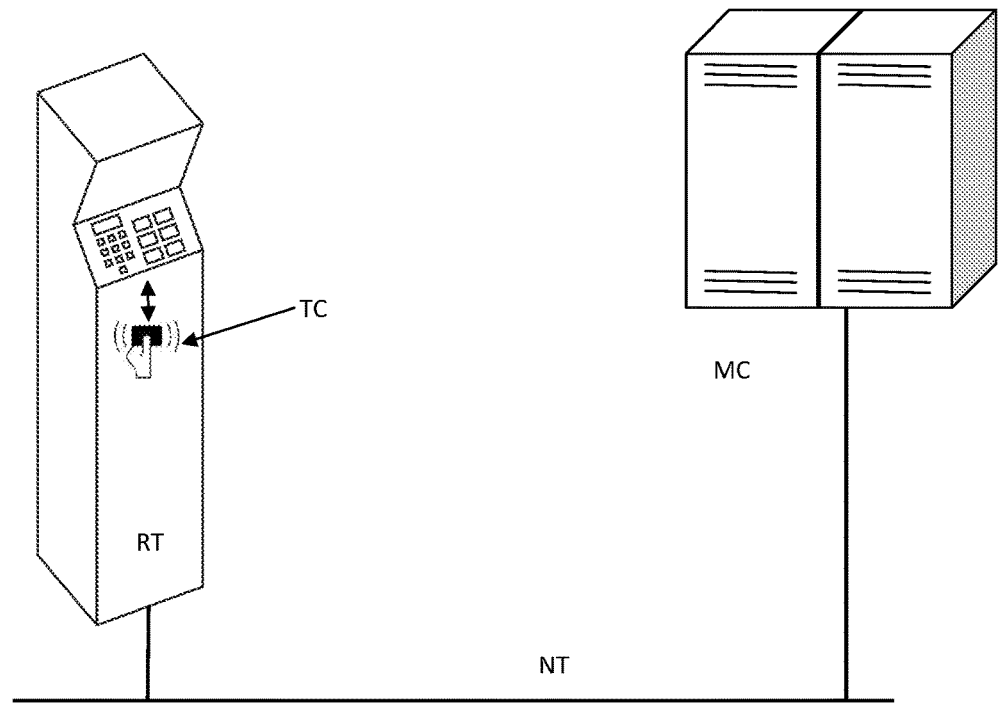
FIG. 2 illustrates the system with the management center connected to one remote terminal.

The FIG. 1 illustrates one example of the display-card. The main and visible feature is the display. The known access control/time management card usually only shows printed elements such as a picture and textual information (name, department or identification number).

The display-card contains electronic components, in particular a processor, clock able to generate a time base, a memory to store setting and temporary data and a driver to drive the display. It also comprises at least one communications device such as a receiver/transmitter, preferably with a short range wireless communication standard. The memory stores initialization data, at least the identification of the user and the duration of the working time per day. The memory also stores the status of the employee, i.e. active or inactive state. The active state corresponds with the state during which the employee is working for the company and the inactive state corresponds with the state during which the employee is not working for the company. The state "active" doesn't mean that the employee is necessarily present within the premise of the company but that his time is dedicated to the company and recorded as such.

The initial data recorded in the display-card memory are as follows:
- a first nominal duration per time (R1) corresponding to the nominal working time per day,
- an identification of the user (ID).

These initial data are not supposed to be updated. They are preferably stored in a non-volatile area of the memory such as EEPROM. They are set when the display-card is allocated to a user.

The following data are stored in the memory of the display-card and can be updated by the processor:
- a current time counter (CTC), which represents the current working time per day,
- a total time balance (TTB), which represents the difference between the total current working time and a total expected working time since the last initialization,
- a status information, which represents the state of the display-card i.e. if the user is currently working or not.

The terminal can send several commands to the display-card depending of the display-card state and the process during the day.
- init command: correspond to the first time the display-card is presented to the terminal for the current day
- hold command: correspond with the next presentation to the terminal of the display-card while in active state un-hold command: corresponds with the next presentation to the terminal of the display-card while in inactive state stop command: corresponds with the presentation of the display-card to the terminal while in active state at a time corresponding to the end of the day. This command is not necessary, the latest hold command of a given day being considered by the management system as the stop command.

As a general rule, the active state is a state during which the current time counter (CTC) is updated by the internal clock of the display card. The inactive state is a state during which the current time counter (CTC) is not updated by the internal clock.

At the beginning of the day, the user comes close to the remote terminal (RT) to activate the display-card and to record the entrance into the working period. The display-card (TC) communicates via the wireless communication device with the remote terminal (RT) to transmit the user's identification ID. In return, the remote terminal transmits an init command that set the status of the display-card to active state. At that time, the current time counter (CTC) is reset and the update of this time counter by the processor of the display-card can take place. The command sent by the remote terminal is an init command having the function of resetting the current time counter (CTC) which represents the state at the beginning of the day. Additionally, the terminal can transfer the value of the total time balance (TTB) representing the balance of the current total working time from the last initialization, taking into account a total expected working time (e.g. 180 hours per month). This initialization could be the first day of employment of said employee or is carried out every month according to the company's policy. The init command can also comprise a reference clock to update the internal clock of the display-card. Even if the internal clock is not precise, at least once a day, the internal clock is updated by an accurate clock source (i.e. the reference clock) located in the remote terminal or received by the remote terminal from the server.

The remote terminal keeps track of the passage of the user and records the date and time of the init command (as well as all other commands) for its own calculation of the working time.

At a later stage, the remote terminal can send a hold command which turns the display-card into inactive state without resetting the current time counter. This state corresponds to the lunch break for example or any absence during the working day. The value of the current time counter is frozen. At the end of the lunch break, the user returns to the remote terminal and then receives a un-hold command which turns the display-card into active state without resetting the current time counter. At the end of the day, the display-card will receive a stop command which has the effect of stopping the current time counter and set the state of the display-card to inactive state. The stop command entails the calculation of the day time balance. The day time balance is calculated with the difference between the current time counter and the first nominal duration per time (R1). This difference could be positive i.e. the employee has worked more that the expected time or negative, i.e. the employee has worked less that the expected time.

The stop command is sent to the display card from a time of the day when the employee is supposed to leave the company. In case that it was only a temporary break, and the employee returns to the company, the terminal sends an un-hold command which set the display-card to active state and thus continue to update the current time counter. It is to be noted that the stop command can be replaced by an hold command, the management center carrying out the calculation of the working time for the current day during the night.

The remote terminal generates an init command each time a display-card is presented for the first time of the day. A command to set the display-card from active to inactive state or vice-versa can be transmitted by the remote terminal each time the display-card is presented to the terminal, whatever will be the time during the day. The terminal (or the time management system) keeps an image of the display-card status and comprises also a reference current timer counter and a reference total time balance. The update of these reference counters by the terminal is made independently of the update in the display-card. This is why the terminal calculates the reference total time balance from the reference current time counter and then transfers this value to the total time balance of the display-card.

According to one embodiment of the invention, the remote terminal (RT) further transmits a total time balance (i.e. the value of the reference total time balance) which represents the balance of the total working time for the current period (e.g. a month, a year or the overall balance from the first active day of the employee). This value is preferably sent with the init command and this value is stored in the total time balance (TTB) for further processing by the processor. This value can be displayed on the display-card upon request of the user.

With the internal clock of the display-card, the current time counter CTC is constantly updated (e.g. every minute) to take into account the on-going working time.

The display-card (TC) preferably comprises at least one button to activate the display of information. In the FIG. 1, it is illustrated by the symbol ⏻. Once pressed by the user, the processor reacts by activating the display and extracting at least the value of the current time counter. This value is displayed on the screen of the display-card. It indicates to the user how long he has worked for the current day.

Additional information can be displayed at the same time such as the remaining time until the expected working time per day is completed. The processor calculates the difference between the first nominal duration (R1) and the current time counter to determine how long the user is supposed to work for that day. This difference is displayed as well.

In the example illustrated to the FIG. 1, the current time counter contains the value 7h47 which represents the time the display-card is entered into the active state. The first nominal duration (R1) is in our case 8h12, so the remaining time is 0h25 until the expected time per day is completed as shown in the FIG. 1.

In the case that the total time balance (TTB) is displayed as well, the processor checks if the remaining time is negative (i.e. the current time counter is greater that the first nominal duration). This means that the user has exceeded the expected duration for the current day. In this case, this extra time is added to the value of the total time balance and this result of the operation is displayed on the screen of the display-card.

In the example of the FIG. 1, the Total Month is −3h21. This value represents the status at the time the init command was received by the display-car, i.e. not taking into account the current day. During the day, the user requests the display of information and the Today Total and Due are displayed representing the current status of the employee. These information change with the time. When the user has completed the expected duration (first nominal duration R1), the Total Month is updated with the overtime executed that day.

When the user is willing to leave the company, the display-card is once again connected to the remote terminal (RT) and identification by the remote terminal is carried out with the user's identification. The display-card receives a stop command to change its state into inactive state. In this state, the processor stops the update of the current time counter. From that time, each time that the user activates the display of information, the same Today Total and Due will be displayed.

The remote terminal (RT) is in communication with a management center (MC) to store, manage, report the working time of all users. The remote terminal (RT) can by a front-end device which serves only as interface with the display-card and relay the messages from and to the display-card to the management center (MC). All calculations are executed by the management center (MC).

In another embodiment, the remote terminal (RT) is only sporadically in communication with the management center (MC), and locally generates the commands and stores the data related to a user. These data are then transferred in a subsequent communication with the management center via the main network NT. The management center can determine the latest status of the working time of the user and update the remote terminal with the latest information concerning a user. The remote terminal is then ready to communicate, at the next passage of the user, the current total time value representing the total working time for the month.

The functionalities of the display-card can be extended by the display of messages. The memory of the display-card further comprises a message management section to store messages received via the communication device. The memory is organized in set of message records, each record comprising at least a text portion and an expiration date. The record can further contain a pop-up time, i.e. a time when the message is to be displayed. In case that the message is a reminder, a pop-up time can be associated with the message and the processor, thanks to the time given by the internal clock, can force the display of the message. The display of a message can be accompanied with the vibration and/or a sound produced by the display-card. The user has then the choice to cancel the message (e.g. arrow ↓) or postpone the reminder (e.g. arrow ↑).

These messages can be determined by the management center (MC) which is connected to the messaging application of the employees. These messages are transferred to the remote terminal and stored locally, ready to be transferred to the display-card when the user come close to it. These messages are, according to one example, the reminders that the user has recorded into its messaging application such as Outlook™.

Other type of messages can be recorded into the message records such a general information to the employees or the menu(s) of the day. These messages can be displayed on request by the user by activating the display-card at any time as shown in the FIG. 1. The messages can be scrolled using the arrows ↓↑ located on the display-card.

The processor checks if the expiration date of a message has passed and in the positive event, the message is deleted.

According to the preferred embodiment, the display-card has the shape of a credit card.

According to one embodiment of the invention, the display-card is battery powered. This battery can be of the rechargeable or non-rechargeable type. In case of a rechargeable battery, the display-card preferably comprises an antenna to receive the power via a wireless charger. This charging method can be combined or replaced with the solar panel, for example the screen is used as solar panel as well.

According to an embodiment of the invention, the system of the invention comprises a management center, in connection with at least one remote terminal and a plurality of display-cards, each being allocated to a specific user. The management center keeps track of all communications between the (or one on) remote terminal and the display-cards. The management center record the working time of each employee and update the reference working time and reference total working balance for each employee. Each time a display-card is presented to the remote terminal, the latter receives the user's identification of the employee and the management center can record the time when a modification (active or inactive) was carried out.

The display-card as presented above is a nice and cost effective solution allowing each user to keep track of its own working time.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A display-card for time management, the display-card comprising:
  a display;
  a clock defining a current date and time;
  a memory;
  an internal power supply;
  said memory comprising a user identifier (ID), setup information and time information,
  said time information comprising at least a current time counter (CTC) and status information,
  said status information defining whether a status of the display-card is an active state or an inactive state,
  the active state enabling an update of the CTC based on the clock and the inactive state disabling the update of the CTC;
  a receiver/transmitter configured to receive a command to initiate a change of the status information from the active state to the inactive state, or from the inactive state to the active state; and
  an actuator configured to initiate displaying, by the display, of at least the CTC.

2. The display-card of claim 1, wherein the display-card is configured to receive an init command to change the status to the active state and to reset the CTC.

3. The display-card of claim 1, wherein the setup information comprises a first nominal duration per time unit, the displaying of the CTC further comprising displaying of a difference between the CTC and the first nominal duration per time unit.

4. The display-card of the claim 3, wherein the first nominal duration represents an expected working time per day, and the CTC represents a current active working time per day.

5. The display-card of claim 1, wherein said memory further comprises a total time balance corresponding to a difference between an expected working time and a current working time over a plurality of days, said total time balance being displayed on the display.

6. The display-card of claim 5, wherein the total time balance is updated via the receiver/transmitter with a reference total time balance.

7. The display-card of claim 1, wherein the clock is updated via the receiver/transmitter with a reference clock.

8. The display-card of claim 1, wherein the receiver/transmitter is configured to perform wireless communications.

9. The display-card of claim 1, wherein the memory further comprises a message management section to store messages received via the receiver/transmitter, said actuator being further configured to initiate displaying, by the display, of the messages.

10. The display-card of claim 9, wherein the clock is configured to define a date and time, and wherein the message management section comprises a set of message records, each message record comprising a text portion and an expiration date, the display-card automatically discarding the messages for which the expiration date is before the current date and time.

11. A method to give access remotely to a current time counter (CTC) of a display-card, said CTC representing a current active working time per day managed by a management center connected to a remote terminal, said terminal being able to communicate wirelessly with the display-card, said display-card including a display, a clock defining a current date and time, a memory, and an internal power supply and at least one communication device, said memory including a user identifier (ID), setup information and time information, said time information including at least a CTC and status information, said status information defining whether a status of the display-card is an active state or an inactive state, said method comprising:
  receiving by the display-card an init command from the remote terminal via the communication device, said init command setting the status to the active state and resetting the CTC;
  updating the CTC with the clock while the status is the active state;
  receiving a hold command from the remote terminal, said hold command setting the status into the inactive state and disabling the updating of the CTC by the clock;
  receiving an un-hold command from the remote terminal, said un-hold command setting the status to the active state and enabling the updating of the CTC by the clock; and
  requesting the display of the CTC through an at least one actuator on the display-card, and displaying the CTC on the display of the display of the display-card.

12. The method of claim 11, wherein, the setup information comprises a first nominal duration per time unit, the displaying of the CTC further comprising displaying a difference between the CTC and the first nominal duration per time unit.

13. The method of claim 11, wherein,
  the memory further comprises a message management section to store messages received via the communication device, and
  the method further comprises:
  initiating, by at least one actuator of the display-card, displaying, by the display, of said messages.

* * * * *